US012700084B1

(12) United States Patent
Kotula

(10) Patent No.: US 12,700,084 B1
(45) Date of Patent: Aug. 4, 2026

(54) METHOD AND SYSTEM FOR INSPECTING PACKAGES FOR PACKAGING DEFECTS

(71) Applicant: Sensors Incorporated, Delano, MN (US)

(72) Inventor: David J. Kotula, Maple Plain, MN (US)

(73) Assignee: Sensors Incorporated, Delano, MN (US)

( * ) Notice: Subject to any disclaimer, the term of this patent is extended or adjusted under 35 U.S.C. 154(b) by 0 days.

(21) Appl. No.: 19/328,510

(22) Filed: Sep. 15, 2025

(51) Int. Cl.
*G06T 7/00* (2017.01)
*G06T 7/60* (2017.01)
*G06T 15/10* (2011.01)

(52) U.S. Cl.
CPC ................ *G06T 7/001* (2013.01); *G06T 7/60* (2013.01); *G06T 15/10* (2013.01); *G06T 2207/10008* (2013.01); *G06T 2207/20092* (2013.01)

(58) Field of Classification Search
CPC ........... G06T 7/001; G06T 7/60; G06T 15/10; G06T 2207/10008; G06T 2207/20092
See application file for complete search history.

(56) References Cited

U.S. PATENT DOCUMENTS

| | | | | |
|---|---|---|---|---|
| 8,489,232 | B2 * | 7/2013 | Mishra | H04N 7/18 235/384 |
| 10,096,131 | B2 | 10/2018 | Driegan et al. | |
| 10,989,795 | B2 | 4/2021 | Zweigle et al. | |
| 11,878,873 | B2 | 1/2024 | Simon | |
| 12,400,320 | B1 * | 8/2025 | Kotula | B65G 69/00 |
| 2017/0213334 | A1 * | 7/2017 | Ducharme | G06T 7/0006 |
| 2021/0201471 | A1 | 7/2021 | Sreeram et al. | |
| 2021/0299879 | A1 | 9/2021 | Pinter et al. | |
| 2022/0258987 | A1 * | 8/2022 | Simon | G01B 11/245 |

FOREIGN PATENT DOCUMENTS

| | | |
|---|---|---|
| WO | 2018189627 A1 | 10/2018 |
| WO | 2023152374 A1 | 8/2023 |

OTHER PUBLICATIONS

International Search Report and Written Opinion dated Oct. 6, 2025, issued in related international application No. PCT/US2025/032387, 13 pages.
Ding et al., "Stitching of depth and color images from multiple RGB-D sensors for extended field of view," International Journal of Advanced Robotic Systems (2019).
Fu et al., "Joint Texture and Geometry Optimization for RGB-D Reconstruction," CVF Conference on Computer Vision and Pattern Recognition (CVPR), pp. 5950-5959 (2020).

(Continued)

*Primary Examiner* — Tom Y Lu
(74) *Attorney, Agent, or Firm* — Gardella Alciati

(57) ABSTRACT

Systems and methods are disclosed for detecting package defects in a target package transported on a conveyance. The expected shape and volume of the target package is pre-defined and represented as a reference package polyhedron. Imaging data is gathered for the target package. The imaging data is converted into a target package polyhedron and compared with the reference package polyhedron. The target package is flagged as potentially defective when the target package polyhedron is unable to fit within the reference package polyhedron.

29 Claims, 8 Drawing Sheets

(56) References Cited

OTHER PUBLICATIONS

Alexiadis et al., "Real-Time, Full 3-D Reconstruction of Moving Foreground Objects From Multiple Consumer Depth Cameras," in IEEE Transactions on Multimedia, vol. 15, No. 2, pp. 339-358 (2013).

Watson et al., "Full 3D Reconstruction From Multiple RGB-D Cameras" USF Tampa Graduate Theses and Dissertations. https://digitalcommons.usf.edu/etd/4607 (2013).

Cao et al., "Real-time High-accuracy Three-Dimensional Reconstruction with Consumer RGB-D Cameras," ACM Transactions on Graphics, vol. 37, No. 5, Article 171. (2018).

Penelle et al., "Geometrical 3D reconstruction using real-time RGB-D cameras," 2011 International Conference on 3D Imaging (IC3D), Liege, Belgium, pp. 1-8 (2018).

* cited by examiner

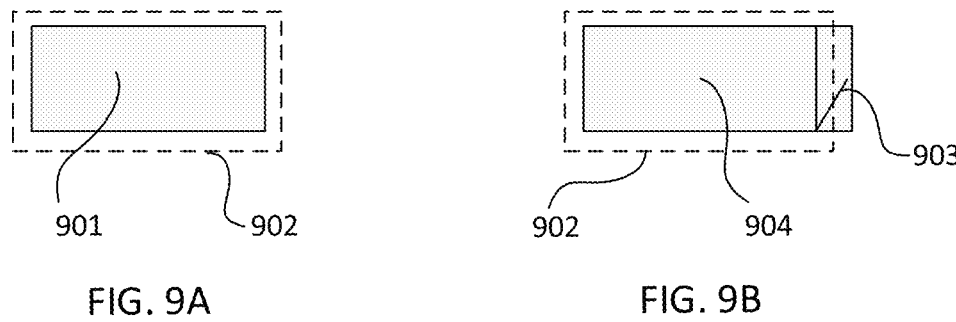
FIG. 9A                 FIG. 9B
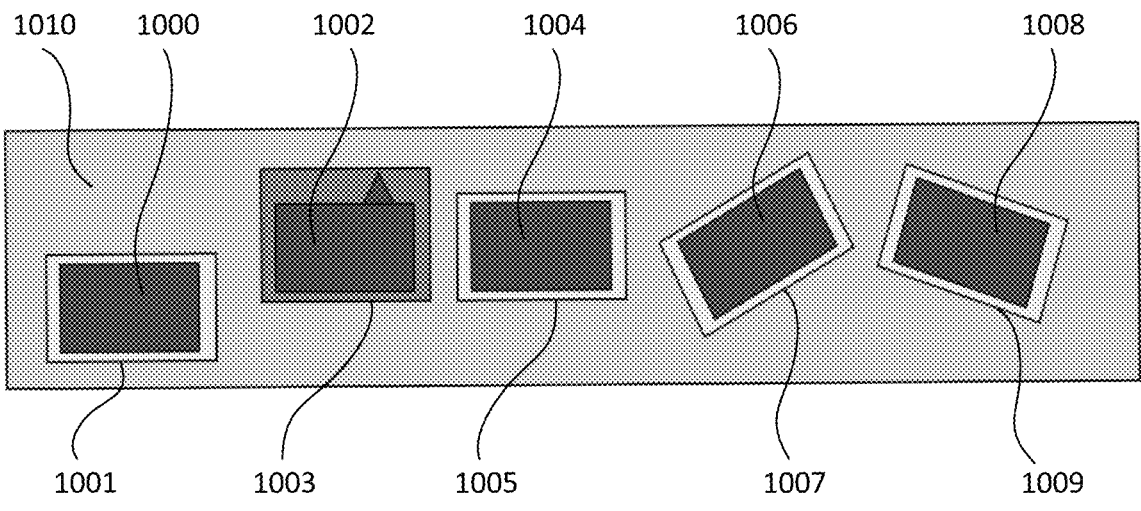
FIG. 10

METHOD AND SYSTEM FOR INSPECTING PACKAGES FOR PACKAGING DEFECTS

BACKGROUND

In many industries, products are packaged prior to shipment or sale. The quality of these packages is important for protecting the product, maintaining a consistent brand presentation, and ensuring compliance with regulatory requirements. Defects such as dents, tears, bulges, improper seals, misaligned labels, or contamination can occur during manufacturing, filling, sealing, or handling. If such defects go undetected, they may result in product damage, reduced shelf life, safety hazards, or customer dissatisfaction.

Conventional package inspection systems often rely on manual visual inspection, two-dimensional (2D) imaging, or a combination of the two. Manual inspection is labor-intensive, inconsistent, and prone to human error, particularly at high production speeds. 2D camera systems can automate portions of the inspection process, but are typically limited to detecting surface color variations or features in a single plane. Such systems may fail to detect subtle or three-dimensional defects, including depth variations, surface deformations, or volumetric anomalies.

Some existing machine vision systems attempt to infer depth information from multiple 2D images taken at different angles, but these approaches can be computationally intensive, sensitive to lighting conditions, and difficult to integrate into production environments with variable package shapes and sizes. Furthermore, many existing systems are unable to provide real-time defect detection with the accuracy and resolution required for high-throughput manufacturing lines.

Accordingly, there is a need for improved package defect detection systems that can capture and analyze true three-dimensional surface and volume data in real time, operate reliably in variable lighting and environmental conditions, and be integrated into existing manufacturing workflows. Systems employing 3D imaging technologies, such as stereoscopic cameras, structured light, or time-of-flight sensors, have the potential to address these shortcomings by providing accurate, high-resolution depth measurements suitable for automated defect identification.

SUMMARY OF ILLUSTRATIVE EMBODIMENTS

Packaged products are inspected for packaging defects using a three-dimensional (3D) imaging system, according to methods and systems described herein. Target packages are imaged to determine their shape. The target package's shape is then compared to a reference package shape. If the target package's shape exceeds any dimension of the reference package shape, a protrusion is detected, and the target package receives a fail designation.

In many embodiments, the 3D imaging system is placed around a conveyance such as a belt conveyor, roller conveyor, skate wheel conveyor, or chain conveyor, and inspects target packages as they move along the conveyance. Other embodiments, for instance deployed in fulfillment and distribution centers, may have palletizing/depalletizing and/or bin replenishment/picking robotic systems that handle/convey packages. These systems can be programmed or enhanced to perform packaging defect inspection while otherwise handling packages.

In one aspect, the present disclosure relates to a method for detecting package defects during conveyance. The method is adapted to gather 3D image data for a 3D target package, while the target package lies within or traverses a scanning station. The 3D image data is gathered from at least two different viewpoints above the conveyance. Some embodiments utilize three, four or more viewpoints. It is desirable to gather 3D image data for all sides of the target package, except the side facing down into the conveyor.

Although many different arrangements of the viewpoints are possible, in order to gather data on five sides of a six-sided box, for example, viewpoints must be arranged to the left and right of, and above, the conveyor. Generally, two viewpoints can satisfy this condition for most arbitrary package orientations, but three viewpoints can ensure that all arbitrary box orientations have five visible sides. More viewpoints may also be used, if required for a given set of implementation constraints.

In some embodiments, each target package has a reference package with a predefined 3D shape of specific dimensions ("reference package polyhedron"). This reference package polyhedron surrounds all sides of the reference package. For a six-sided box package, the shape will be a rectangular cuboid.

In some embodiments, when traversing the conveyor, 3D image data gathered from a target package is translated into a 3D shape ("target package polyhedron"), a 3D polyhedron of specific dimensions surrounding all sides of the target package. For a six-sided box, the target package polyhedron will be also be a rectangular cuboid.

In some embodiments, the target package polyhedron is compared to the reference package polyhedron provided for that target package, to see if the reference package polyhedron can envelope the target package polyhedron. If the target package polyhedron's volume fits within the volume of the reference package polyhedron, the package receives a PASS designation. If the target package polyhedron's volume does not fit within the volume of the reference package polyhedron, the package receives a FAIL designation.

In some embodiments, the reference package polyhedron is provided a certain amount of tolerance to one or multiple dimensions. For example, the reference package polyhedron may be 1 inch larger in every dimension. The tolerances increase the overall volume of the reference package polyhedron. This allows for some variation in the target package, to accommodate minor differences to dimensions that would not be considered a package defect.

In an alternative embodiment, a single two-dimensional (2D) section of the target package is inspected. A 2D section of the target package is derived from a plane passing through the target package from any angle. This plane may be through the target package or along a surface of the target package. A 2D target package polygon is calculated for a section cut of the target package. For a plane passing through the target package, the 2D target package polygon is compared to the 3D reference package polyhedron. If the 2D target package polygon does not fit entirely within the 3D reference package polyhedron, the target package receives a FAIL designation. For a plane along the surface of the target package, a 2D target package polygon is calculated for that surface, which is then compared to a predefined 2D reference package polygon for that respected surface. If the 2D target package polygon does not fit entirely within the area of the predefined 2D reference package polygon, the target package receives a FAIL designation.

A target package polyhedron, or target package polygon, may exceed the volume of the reference package polyhedron, or polygon, under various defects. These defects may generally be described as protrusions. The source of a protrusion could be a hole in the package and contents extending out, an open flap on a box, a loose label, or an external object puncturing or otherwise attached to the side of the target package.

In another aspect, a system is disclosed for practicing methods such as described above. The system comprises multiple 3D cameras, which can be staring laser line profilers in configurations where target packages translate past a projected laser line. The cameras may also be volume scanning 3D cameras (i.e., snapshot cameras that gather depth data at multiple x and y angular deflections). Preferably, the system is calibrated with the relative spatial locations and staring angles of the 3D cameras, which is particularly beneficial in embodiments where the data from multiple cameras is merged. The system may also comprise a coordinate transformation module, with particularly useful coordinate systems being those that place nominal target package edges perpendicular to at least one axis of the coordinate system. A consistency measurement module and defect decision module process the data, e.g., as described above.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2A shows a plan view of a configuration of a 3D package inspection system according to an embodiment with four cameras, for use with a conveyance that translates packages past a scanning station;

FIG. 2C shows a right-side elevation of a configuration of a 3D package inspection system according to an embodiment with four cameras, for use with a conveyance that translates packages past a scanning station;

FIG. 4A shows a plan view of a configuration of a 3D package inspection system according to an embodiment with two cameras, for use with a conveyance that translates packages past a scanning station;

FIG. 4C shows a right-side elevation of a configuration of a 3D package inspection system according to an embodiment with two cameras, for use with a conveyance that translates packages past a scanning station;

FIG. 9A shows a planar face of a target package and a 2D target package polygon around the planar face;

FIG. 9B shows a planar face of a target package with a protrusion and a 2D target package polygon extending to encompass the planar face and protrusion;

FIG. 10 shows a plan view of a conveyor with five target packages in various orientations;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Figure 1:
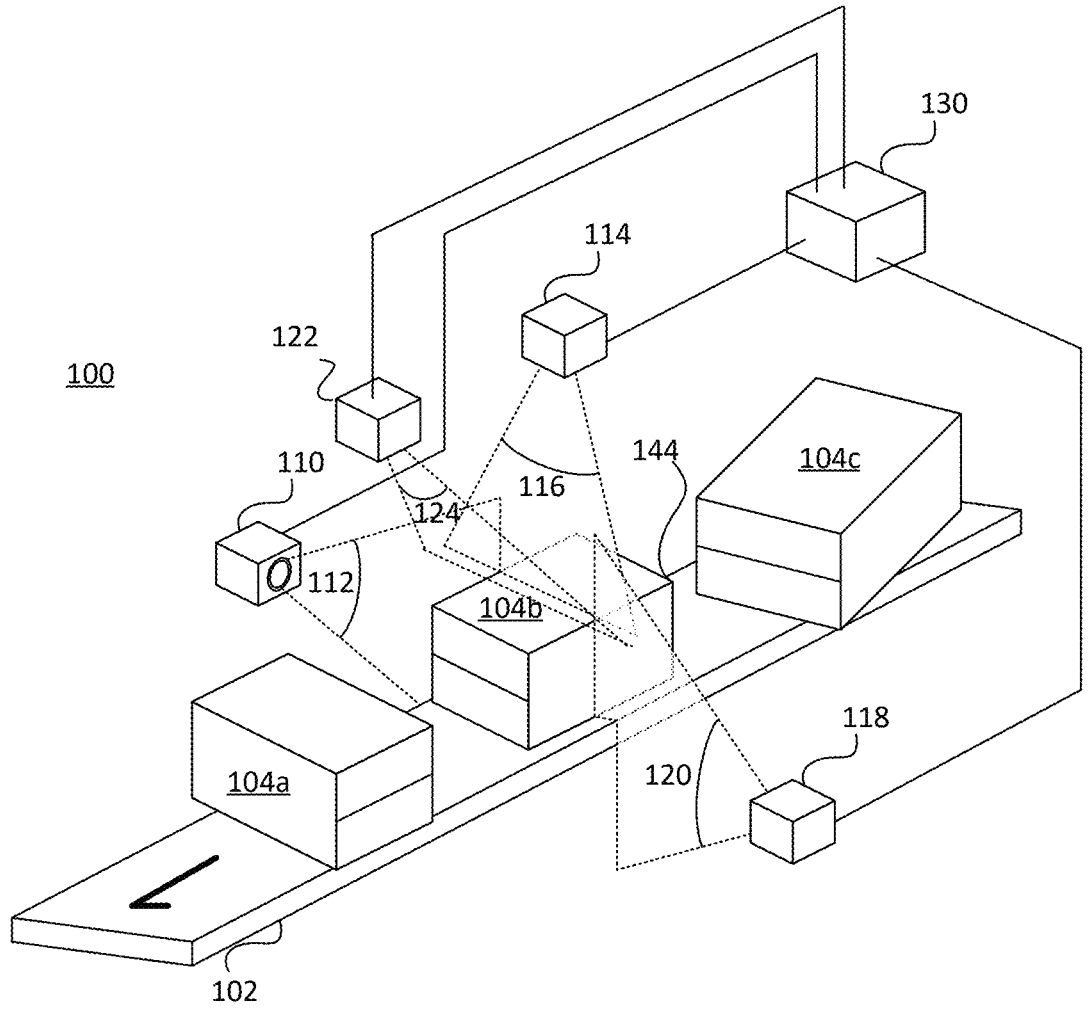
FIG. 1 illustrates a configuration of a 3D package inspection system according to an embodiment, for use with a conveyance that translates packages past a scanning station.

As demonstrated in FIG. 1, an embodiment system 100 can be arranged about a conveyance 102 along which target packages 104a, 104b, 104c move. The target packages may all be of a standard shape and size, or may be of varying shapes/sizes. The target packages may all be in a fixed orientation as they pass the imaging cameras, or somewhat constrained, or unconstrained. The fixed orientation may or may not always present the target package "top" on top, target package "front" facing a certain direction, etc., or not. Finally, inspection of the side of the target package resting on the conveyance will generally not be possible, unless at some point the target package orientation is changed to allow so. Depending on which of these various constraints exist in a system, different camera orientations may be desirable, and it may be possible where physical constraints exist to make assumptions that simplify processing.

System 100 comprises four 3D cameras 110, 114, 118, and 122 each outputting image data to a processor system 130. The system may comprise a frame and/or mounts to hold the components (not shown), or they may be mounted opportunistically within a production environment. In one embodiment, each of cameras 110, 114, 118, and 122 are LMI Gocator 2380 3D laser line profilers, available from LMI Technologies Inc. of Vancouver, BC, Canada. These laser line profilers gather 1280 linear data points per scan line, at a spacing of 0.375 mm at a near field of view of 35 cm, and have a z (depth) resolution of 0.092 mm, from 35 cm to 115 cm working distance. In one configuration according to FIG. 1, the four cameras were located so as to gather coplanar depth information, with camera 114 located 66 cm above a conveyance surface and projecting a laser line at an angle down in a scan line 116, camera 122 located 66 cm above a conveyance surface and projecting a laser line at an angle down in a scan line 124, and cameras 110 and 118 separated across the conveyance surface by 113.5 cm, each located 15.5 cm above the conveyance surface and centered so as to stare horizontally across the area above the conveyance and project respective scan lines 112, 120. Alternate configurations replace one or more of the laser line profilers with a 3D point cloud area imager, such as a 3D-A5000 series 3D camera available from Cognex Corporation of Natick, MA. In other embodiments, one or more time-of-flight imagers can be included in the imager constellation.

The processor system 130 connects to each camera via a wired or wireless connection, and runs processes to communicate with each camera and ingest raw or pre-processed 3D image data from each camera. The processes may include software and/or Application Programming Interfaces (APIs) supplied by the camera manufacturer. The ingested 3D data is further processed within processor system 130, as will be described below, using one or more microprocessors, graphics processing units (GPUs), field-programmable gate arrays (FPGAs), tensor processing units (TPUs), or other forms of processors programmed and/or hardware-configured to detect package defects.

In some systems, each camera may include an integrated processor capable of performing some image processing operations that would otherwise be performed by processor system 130—such integrated processors may be considered part of the processor system 130. In an alternative embodiment, the system is comprised of an array of 3D smart cameras equipped with internal processors. In this embodiment, there is no need for an external processor system.

The processor system 130 can provide various forms of output (not shown) to signal to a machine or human operator that a package defect, a protrusion, has been detected on a particular target package. The signal can be used, for example, to divert or remove the signaled target package from a production line for different handling and/or inspection.

In some embodiments, the cameras 110, 114, 118, and 122 may be "free running," and the processor system 130 examines data streams from one or more of the cameras to determine when a new target package has entered/exited the scanning station. For instance, top cameras 114 and 122 will return data with no points "higher" than the top surface of the conveyance when empty regions of the conveyance are traversing the conveying volume. A conveying volume containing a target package can be recognized between a first top camera image line that contains a point higher than the top surface of the conveyance and a following top camera image line that contains no point higher than the top surface. Similar package triggers can be initiated based on side cameras 110, 118 by examining portions of image lines 112 and/or 120 above the conveyance for return signals in the conveyance region. In some camera arrangements, with arbitrarily positioned target packages, it may be required that data from all cameras is monitored, e.g., as different cameras could be first/last to detect a particular target package moving into the conveying volume.

The following description assumes a merging of multi-camera data into a common reference frame, but those skilled in the art recognize that various described image data operations can be performed on separate camera data, with resulting descriptions (planes, edges, corners, etc., or consistency measures) instead of camera data merged, or used separately in some cases, to make package defect decisions.

Figure 2B:
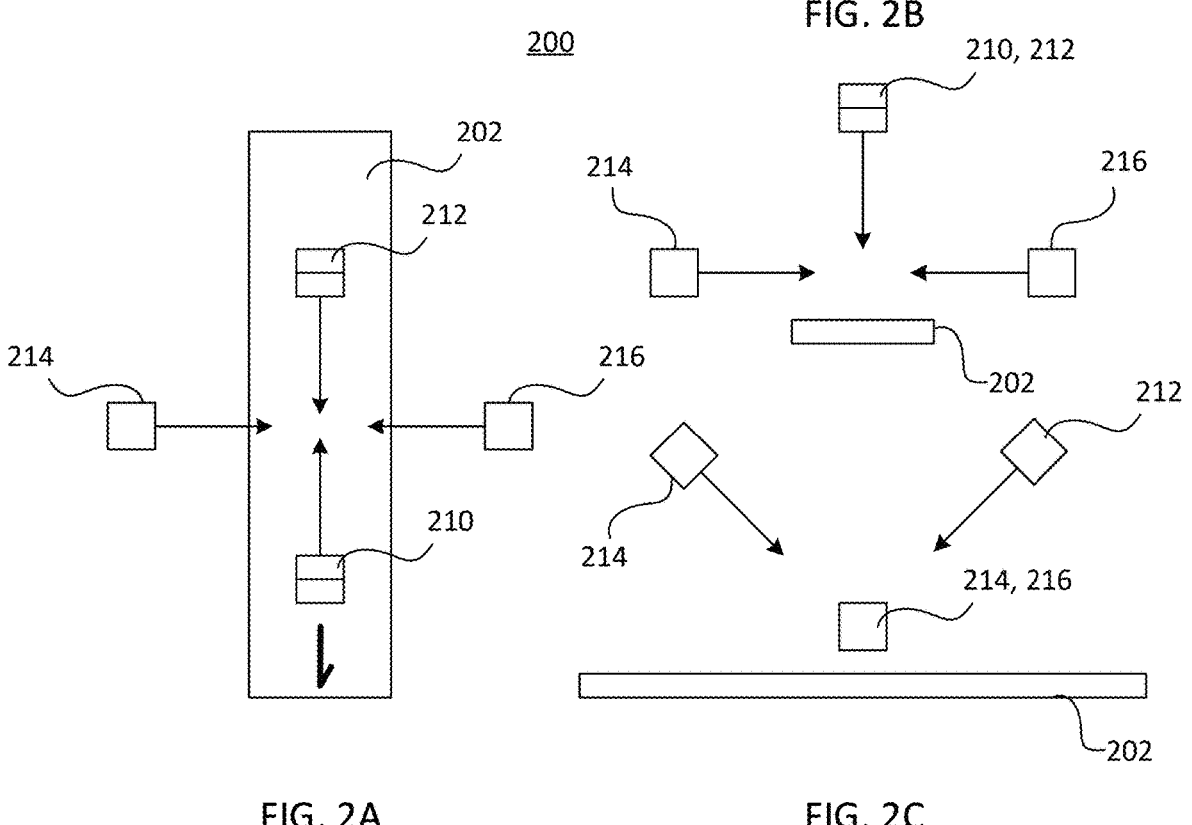
FIG. 2B shows a front elevation of a configuration of a 3D package inspection system according to an embodiment with four cameras, for use with a conveyance that translates packages past a scanning station.

FIGS. 2A-C show, respectively, a plan view, front elevation, and right-side elevation of an alternate 3D camera configuration 200. In configuration 200, a first overhead imager 212 is placed above conveyance 202, staring down and forward (in the direction of conveyance travel). A second overhead imager 210 is placed above conveyance 202, staring down and backward. Two additional imagers 214, 216 are placed to the left and right of the conveyance and staring directly across it.

Figures 3A, 3B, 3C:
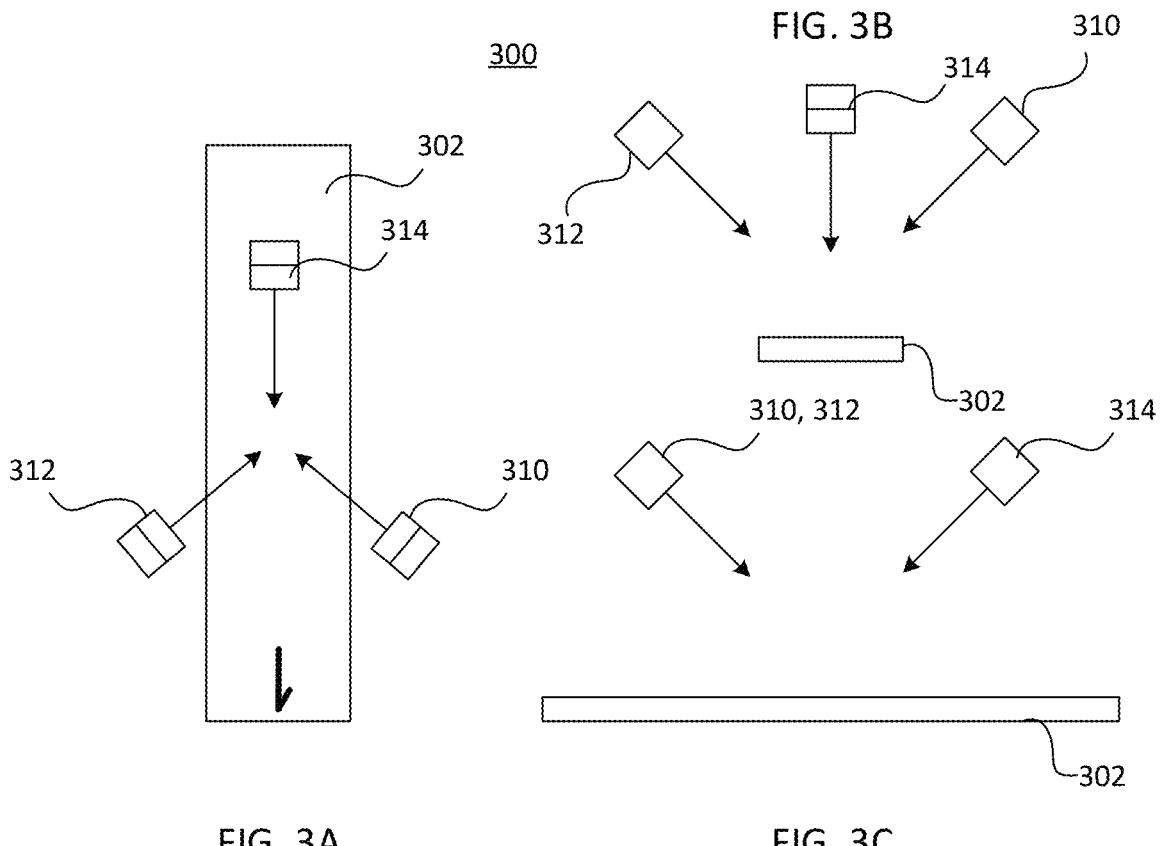
FIG. 3A shows a plan view of a configuration of a 3D package inspection system according to an embodiment with three cameras, for use with a conveyance that translates packages past a scanning station.
FIG. 3B shows a front elevation of a configuration of a 3D package inspection system according to an embodiment with three cameras, for use with a conveyance that translates packages past a scanning station.
FIG. 3C shows a right-side elevation of a configuration of a 3D package inspection system according to an embodiment with three cameras, for use with a conveyance that translates packages past a scanning station.

FIGS. 3A-3C show, respectively, a plan view, front elevation, and right-side elevation of another alternate 3D camera configuration 300. In configuration 300, instead of two overhead imagers and two side imagers as in FIGS. 2A-C, three overhead imagers 310, 312, 314 collect overhead and left, right imaging data. Imager 312 is placed above conveyance 302 and to its left, staring down and backward (opposite the direction of conveyance travel) and right across the conveyance at a 30-degree angle. Imager 310 is placed above conveyance 302 and to its right, staring down and backward and left across the conveyance at a 30-degree angle. Imager 314 is placed above conveyance 302, staring down and forward. It can be appreciated that configuration 300 provides 3D imaging data collection that covers the five visible sides of a target package in any orientation.

Figure 4B:
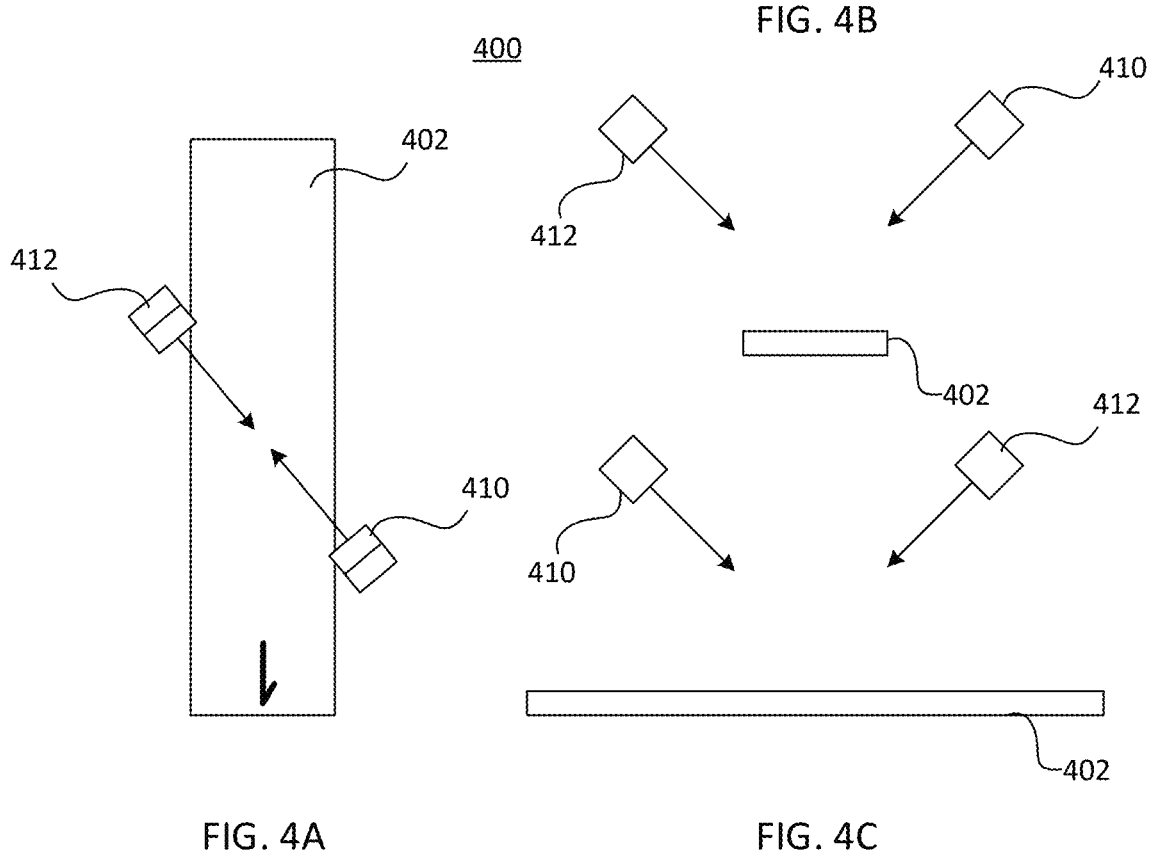
FIG. 4B shows a front elevation of a configuration of a 3D package inspection system according to an embodiment with two cameras, for use with a conveyance that translates packages past a scanning station.

FIGS. 4A-4C show, respectively, a plan view, front elevation, and right-side elevation of another alternate 3D camera configuration 400. In configuration 400, instead of two overhead imagers and two side imagers as in FIGS. 2A-C, the first and second overhead imagers 410, 412 collect both the overhead and the left, right imaging data. Imager 412 is placed above conveyance 402 and to its left, staring down and forward (in the direction of conveyance travel) and right across the conveyance at a 45-degree angle. Imager 410 is placed above conveyance 402 and to its right, staring down and backward and left across the conveyance at a 45-degree angle. It can be appreciated that configuration 400 provides 3D imaging data collection that covers the five visible sides of a target package unless the target package is also oriented at a 45-degree angle, in which case two sides will have little to no data.

From the preceding examples, those skilled in the art will appreciate that many variations on imager constellation may be selected for a particular application. For instance, in FIG. 2A, imagers 210 and 212 could be mounted at a common location (or even be the same imager, with the ability to switch/swivel between forward and rearward staring angles). In such case, larger time offsets between matching data from different viewing angles will be present, but is not an obstacle to merging data unless there is a risk of a target package changing orientation before all data is gathered.

3D imagers may also be used that capture data across an extended field of view in both x and y directions. Such imagers can be operated so as to take several (x, y, z) images of a target package passing their position, when they are, e.g., ahead of, aligned with, and behind a passing target package, such that two such imagers above and to the left and right of a conveyance gather data from all visible sides of a target package in any orientation. Such imagers could also be placed on a conveyance such as a robotic palletization or pick and place system and scan for target package defects at the time a target package is being handled by the robotic system.

Figure 5:
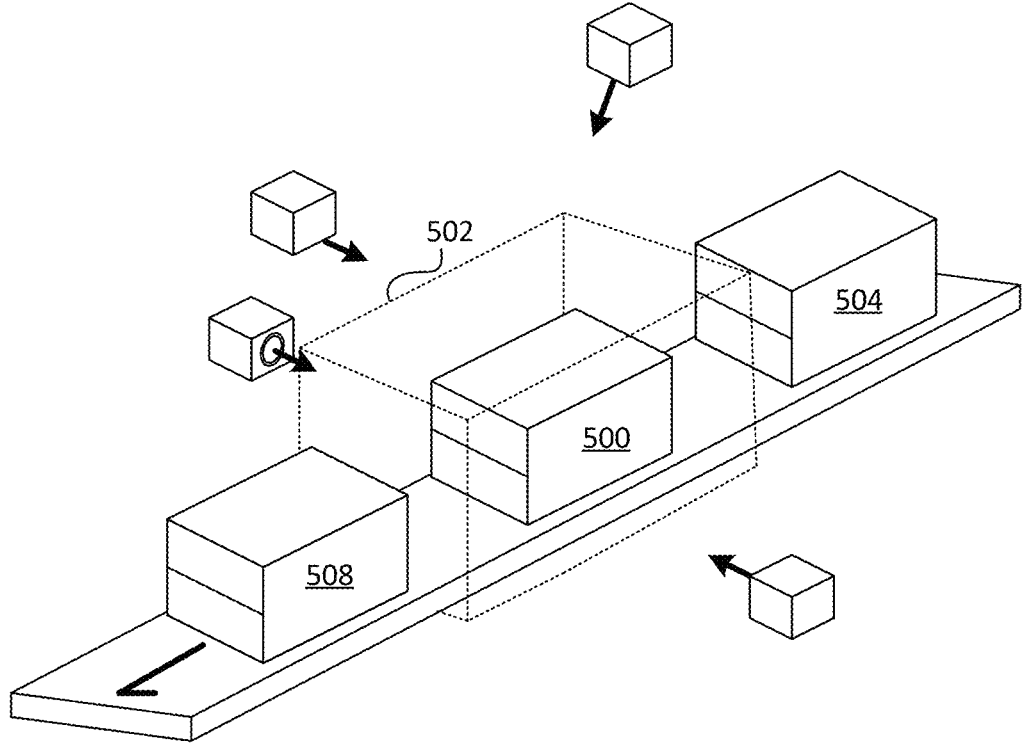
FIG. 5 shows a package scanning station and a moving conveyor.

FIG. 5 shows three target packages 500, 504, and 508 moving along a conveyor. Target package 500 is currently in a scanning station 502, within the range of the four 3D cameras. Data from each camera can be examined separately, or data from two or more cameras can be merged to determine the shape and volume of the target package. A given embodiment may handle target package shapes other than cuboids, for example, a milk carton for which a more complex set of planes describe the nominal shape of a package.

Figure 6A:
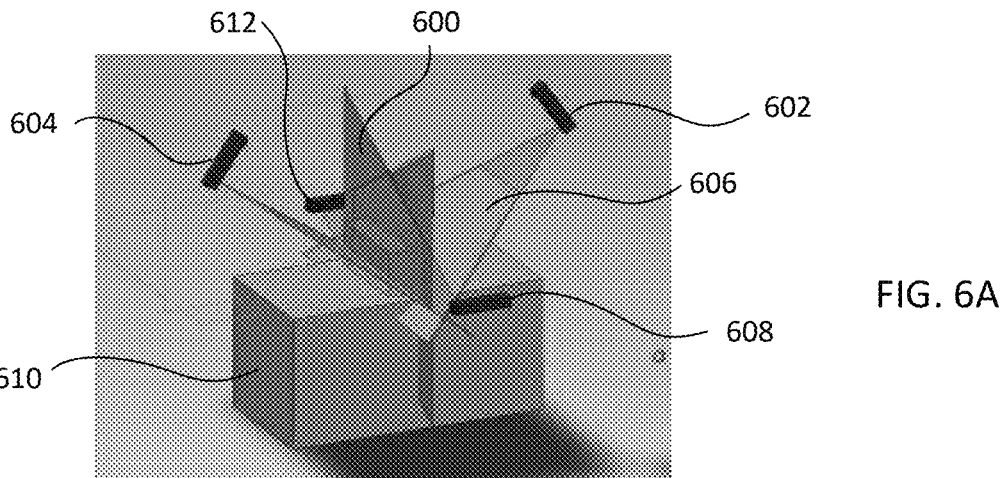
FIG. 6A shows a top front right view of a target package being inspected by four 3D smart cameras.
Figure 6B:
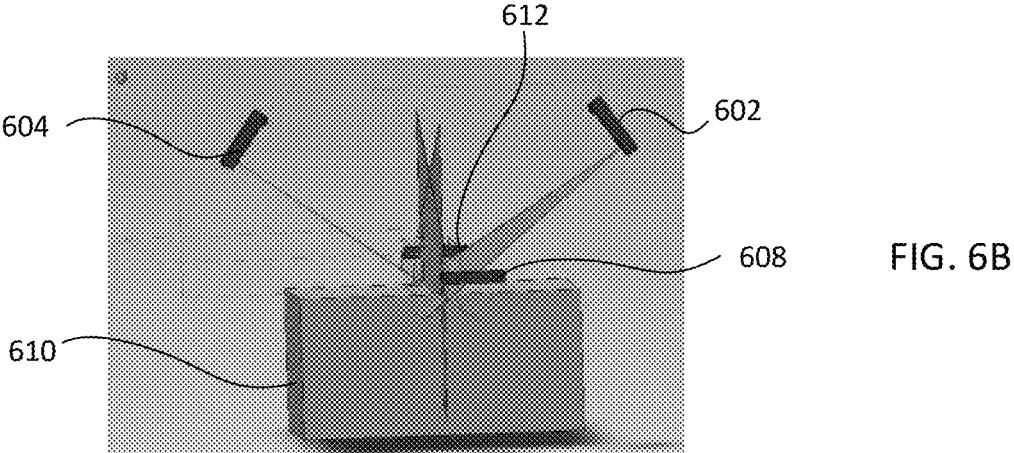
FIG. 6B shows a right-side view of a target package being inspected by four 3D smart cameras.
Figure 6C:
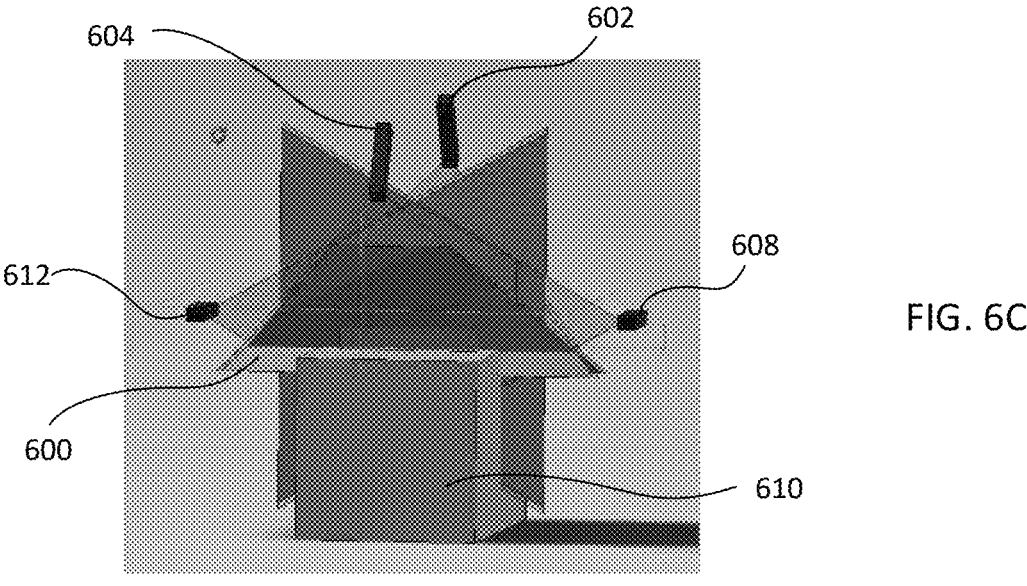
FIG. 6C shows a front view of a target package being inspected by four 3D smart cameras.

FIGS. 6A-C show three views of a target package 610 in the scanning station. In this embodiment, an array of four 3D smart cameras 602, 604, 608, and 612 view the target package. 3D smart cameras are equipped with internal processors, eliminating the need for an external processor.

Each camera calculates the volume of the target package from its perspective. Slices of the target package from each camera, for example 600 and 606, are accumulated as the target package moves over the conveyor. In an alternative embodiment, one or more cameras may change position, and perspectives. In an alternative embodiment, the volume is calculated while the target package remains static.

The accumulated slices are assembled into a 3D shape representing the bounds of the target package, a target package polyhedron. A Hough transform, for example, can be applied to slice data to find a minimum target package polyhedron position and orientation.

Alternately, multiple target package polyhedrons can be calculated independently for multiple slices, or a single target package polyhedron may be calculated using multiple slices or even all data from one or more imagers. In one embodiment, the target package polyhedron is the minimum-sized polyhedron that can envelope the target package. The target package polyhedron may be a simple cuboid with six faces, or complex irregular polyhedron with millions of faces.

In alternative embodiments, a single planar slice representing a 2D target package polygon of a section cut of the target package is analyzed. In one embodiment, the 2D target package polygon is a slice through the target package. In another embodiment, the 2D target package polygon is a planar face of the target package.

The target package in FIGS. 6A-C is a six-sided rectangular cuboid, and the resulting target package polyhedron shape will also be a cuboid. If the dimensions of this target package have sides measuring 120 mm, 100 mm, and 40 mm, the resulting target package polyhedron shape will have the same dimensions, or slightly larger to accommodate a tolerance.

The target package may be a standard cuboid shape, with planar surfaces like a box, or it may be any other 3D shape. Other example target packages may include produce cans, bottles, tubes, or pouches. The cameras' internal processors identify the smallest 3D polyhedron capable of surrounding the target package.

Figure 7:
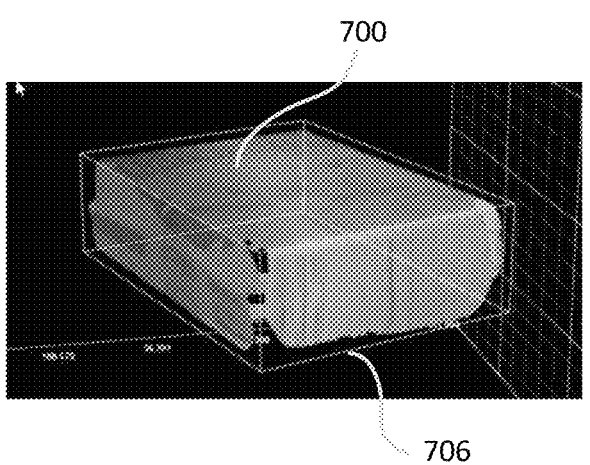
FIG. 7 shows a reference package polyhedron around a target package.

Each target package has a reference package polyhedron, dictating the permissible bounds of the target package. In one embodiment, one or more dimensions of the reference package polyhedron is entered manually. In another embodiment, one or more dimensions of the reference package polyhedron are measured by scanning a reference package with a 3D imaging camera. FIG. 7 shows a rectangular cuboid target package 700 with a reference package polyhedron 706 around the target package. The reference package polyhedron may be a cuboid, or any polyhedron suitable to define the outer bounds of the target package. For irregular 3D shapes, the reference package polyhedron may be comprised of multiple faces approximating the irregular 3D shape.

In one embodiment, the reference package polyhedron provides a measure of tolerance around the target package. For the rectangular cube reference package with sides measuring 120 mm, 100 mm, and 40 mm, a 5 mm measure of tolerance would create a reference package polyhedron with 125 mm, 105 mm, and 45 mm sides. The measure of tolerance can be any length. The measure of tolerance may be various lengths for the different sides of the reference package polyhedron.

In one embodiment, the measure of tolerance is manually selected. In another embodiment, the measure of tolerance is calculated from imaging of one or more target packages. In another embodiment, the measure of tolerance is calculated from an absolute average deviation based on past target packages inspected. A threshold multiple (for instance 1.5×) of the expected absolute deviation can be used to create the reference package polyhedron. The threshold multiple may be set empirically to allow an acceptable amount of target package non-uniformity.

Each target package is inspected to determine its target package polyhedron. The target package polyhedron is compared to the reference package polyhedron for that target package. If the volume of the target package polyhedron fits entirely within, envelopes, the volume of the reference package polyhedron, the target package receives a PASS designation. If the volume of the target package polyhedron does not fit entirely within the reference package polyhedron, the target package receives a FAIL designation. A FAIL designation indicates a protrusion of any type.

For the 120 mm×100 m×40 mm rectangular cuboid package with a reference package polyhedron of 125 mm×105 mm×45 mm, if one side exceeded those tolerances, the target package would receive a FAIL designation. For example, a target package with edges 120 mm×102 mm×50 mm would receive a FAIL designation as the 45 mm side was exceeded, and the target package polyhedron shape would not fit within the reference package polyhedron.

Figure 8A:
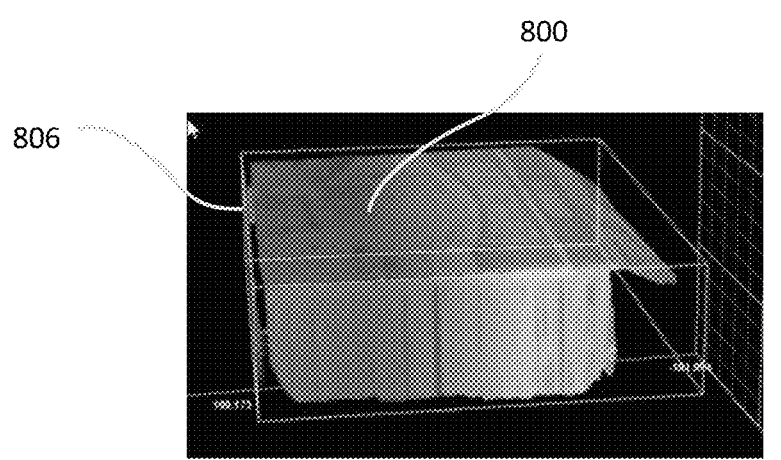
FIG. 8A shows a top front view of a target package polyhedron around an inspected target package with a protrusion.
Figure 8B:
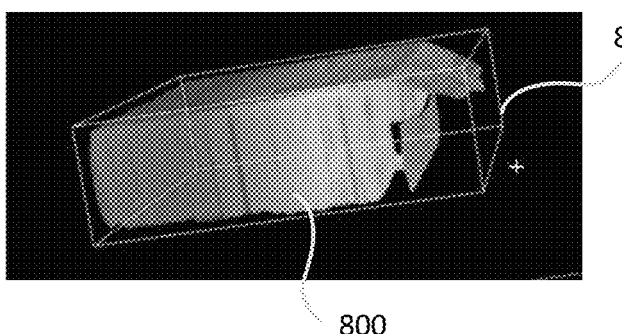
FIG. 8B shows a front right view of target package polyhedron around an inspected target package with a protrusion.

FIGS. 8A-B show a target package polyhedron 806 around inspected target package 800. This target package is a box with an open flap, resulting in the lengthening of one dimension of the target package polyhedron. When compared to the known reference package polyhedron, even with added tolerances, this target package polyhedron is incapable of fitting entirely within the reference package polyhedron. This target package would receive a FAIL designation.

A target package polyhedron may exceed the reference package polyhedron in the case of a protrusion. Protrusions can occur for several reasons. The contents within a package may have breached a wall and extended out of the package. Alternatively, a portion of the package itself may be damaged or unsecure and extend out past the reference package polyhedron. In some situations, a foreign object may have impacted the wall of the target package and remained attached. Each of the above scenarios creates a protrusion extending the target package polyhedron beyond the reference package polyhedron, causing the FAIL designation.

FIGS. 9A-9B show an alternative embodiment inspecting a single 2D planar slice rather than a 3D object. The 2D planar slice may be a section cut through the target package, or an exterior face of one side of the target package. One embodiment inspects a planar slice through the target package. The slice may be taken from any camera, at any angle. The slice is a 2D polygon representing a section cut of the target package and represents the 2D best fit polygon for the target package along that plane. The slice is then compared to the reference package polyhedron. If the 2D best fit polygon cannot fit entirely within the reference package polyhedron, the target package receives a FAIL designation.

Another embodiment inspects a planar slice representing one side of the target package. FIG. 9A shows a target package with a rectangular face on one side. The planar slice is a 2D target package polygon 901 representing the side of a target package. The respective side of the target package has a 2D reference package polygon 902 with specific dimensions. This 2D reference package polygon 902 may include tolerances to increase one or more sides of the polygon.

If the 2D target package polygon 901 does fit entirely within the 2D reference package polygon 902, the target package receives a PASS designation. FIG. 9A shows the 2D target package polygon 901 fitting entirely within the 2D reference package polygon 902, thus receiving a PASS designation. If the 2D target package polygon cannot fit entirely within the 2D reference package polygon, the target package receives a FAIL designation. FIG. 9B shows a target package with an open flap 903, representing one of several types of protrusions. Because the target package has a protrusion, the 2D target package polygon 904 extends beyond the area of the 2D reference package polygon 902, thus receiving a FAIL designation.

Another embodiment detects package defects based on a comparative analysis of extracted features of a target package relative to features of a reference package. One or more features of the reference package are first collected and stored in a reference database. In one embodiment, the features include geometric parameters (e.g., length, width, height, curvature, and edge profile). In another embodiment, the features include surface properties (e.g., reflectivity, texture, and smoothness). In another embodiment, the features include colorimetric attributes (e.g., hue, saturation, and brightness values).

In one embodiment, the features of the reference package are captured using 3D imaging modalities, such as structured light scanning, stereo vision, or time-of-flight sensors, which generate point cloud data representing the package surface geometry. In an alternative embodiment, the features of the reference package are collected using 2D imaging modalities, such as high-resolution RGB cameras, multispectral imaging, or hyperspectral sensors, which capture surface-level visual characteristics.

In one embodiment, a first artificial intelligence model, such as a convolutional neural network (CNN), graph neural network (GNN), or other feature-extraction architecture, processes the raw imaging data to extract latent feature representations associated with the reference package. In some embodiments, the extracted features are determined through supervised machine learning methods, where ground-truth labels corresponding to defect-free packages are used during training. In another embodiment, unsupervised or semi-supervised learning methods, such as autoencoders or clustering algorithms, are employed to learn feature embeddings without explicit labels.

In one embodiment, a target package is then inspected under similar imaging conditions, and one or more features of the target package are extracted. A second artificial intelligence model extracts features associated with the target package. In one embodiment, the features of the target package are collected from 3D imaging data obtained by one or more 3D cameras. In another embodiment, the features are collected through 2D imaging data from one or more 2D cameras.

In one embodiment, the features extracted from the reference package and the target package include geometric and structural attributes, surface characteristics, color information, and latent features derived from artificial intelligence models. In one embodiment, geometric and structural attributes include dimensional measurements such as length, width, height, volume, and edge profile, as well as curvature, surface topology, and symmetry. Such features enable detection of protrusions, warping, denting, bulging, or other deviations in the overall form of the package. In one embodiment, surface characteristics include reflectivity, gloss, smoothness, and texture, which may reveal scratches, scuffs, wrinkles, folds, micro-cracks, pinholes, or coating inconsistencies. In one embodiment, color features include hue, saturation, brightness, and other values derived from RGB, multispectral, or hyperspectral imaging, which allow for identification of fading, blotching, contamination, or print and labeling defects such as misaligned barcodes or missing brand markings. In one embodiment, shape and pattern-based features are extracted, including contour alignment, silhouette matching, and consistency of repeating logos, patterns, or other printed design elements.

In one embodiment, the artificial intelligence model extracts latent feature representations not directly observable by human inspection. For example, in one embodiment, convolutional neural networks (CNNs) generate high-dimensional embeddings that capture combinations of color, texture, and shape. In another embodiment, graph neural networks (GNNs) capture relational properties between points in a 3D mesh or point cloud. In another embodiment, the artificial intelligence model generates anomaly scores or latent embeddings that identify outlier characteristics of a target package relative to the reference package.

In one embodiment, a third artificial intelligence model, such as a similarity-detection model, performs a comparative analysis between the feature vector of the target package and the feature vector of the reference package. If one or more extracted features of the target package are determined to deviate beyond a defined threshold from the features of the reference package, a FAIL designation is issued, indicating a potential defect. Conversely, if no extracted features of the target package deviate beyond the threshold, a PASS designation is issued.

The first, second, and third artificial intelligence models may be continuously refined through active learning and feedback loops in which PASS/FAIL determinations are validated against ground-truth inspection outcomes. Over time, such reinforcement improves feature discrimination, reduces false positives and false negatives, and increases overall classification accuracy and robustness to variations in packaging, imaging conditions, or environmental factors.

The system can inspect packages arranged in any orientation on the conveyor. For example, a rectangular cuboid target package could be positioned with the largest surface face down, and the longest edge parallel to the direction of conveyance. The target package could be rotated 90-degrees such that the longest edge is perpendicular to the direction of conveyance. The target package could be rotated at any angle, with any side face down. With an array of cameras positioned to view all sides above the conveyance, the system can create a target package polyhedron around the package, which it can then compare to the reference package polyhedron.

FIG. 10 shows a top view of a conveyor 1010 with five target packages 1000, 1002, 1004, 1006, 1008. The system is capable of creating target package polyhedron shapes for target packages regardless of their orientation on the conveyor. It is irrelevant whether they are positioned directly in the middle, on any particular side of the package. Measuring the target package polyhedron may occur at any position across the width of the conveyor. It is irrelevant whether the target package is positioned parallel or at a particular angle to the conveyor. Target package 1000 is positioned on the conveyor closer to the near edge. It fits entirely within the reference package polyhedron 1001 and receives a PASS designation. Target package 1002 is positioned in the center of the conveyor but has a protrusion on the far side. Its target package polyhedron 1003 does not fit entirely within the reference package polyhedron and receives a FAIL designation. Target package 1004 is positioned in the center of the conveyor. It fits entirely within the reference package polyhedron 1005 and receives a PASS designation. Target package 1006 is positioned in the center of the conveyor and is rotated 30 degrees counterclockwise. It fits entirely within the reference package polyhedron 1007 and receives a PASS designation. Target package 1008 is positioned in the center of the conveyor and is rotated 30 degrees clockwise. It fits entirely within the reference package polyhedron 1009 and receives a PASS designation.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventor intended that that feature or function may be deployed, utilized or implemented in connection with the alternative embodiment unless the feature or function is incompatible with the alternative embodiment.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer.

These computer program instructions can direct a computing device or other programmable data processing apparatus to function in a particular manner, such that the instructions stored in the computer-readable medium produce an article of manufacture including instruction means which implement the function/operation specified in the illustrated process flows.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a wired or wireless LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for detecting package defects in a three-dimensional (3D) target package, the method comprising:
   receiving data representing one or more dimensions of a 3D reference package,
   determining, from the data representing one or more dimensions of the 3D reference package, a reference package polyhedron,
   moving the target package along a conveyor,
   receiving two or more two-dimensional (2D) slices of the target package as the target package moves along the conveyor,
   assembling the 2D slices into 3D imaging data representing one or more dimensions of the target package,
   receiving the 3D imaging data representing one or more dimensions of the target package,
   determining, from the 3D imaging data representing one or more dimensions of the target package, a target package polyhedron, wherein the target package polyhedron is sufficient to enclose the target package,
   comparing the reference package polyhedron to the target package polyhedron, issuing a pass/fail designation for the target package, wherein
      a pass designation is issued if the reference package polyhedron is large enough to enclose the target package polyhedron, and
      a fail designation is issued if the reference package polyhedron is not large enough to enclose the target package polyhedron.

2. The method of claim 1, wherein receiving data representing one or more dimensions of a 3D reference package further comprises the step of manually entering the one or more dimensions of the 3D reference package.

3. The method of claim 1, wherein receiving data representing one or more dimensions of a 3D reference package further comprises the step of scanning a reference package with a 3D camera.

4. The method of claim 1, wherein determining, from the data representing one or more dimensions of the 3D reference package, a reference package polyhedron further comprises the step of adding a length to one or more dimensions of the reference package polyhedron.

5. The method of claim 4, wherein the length is manually selected.

6. The method of claim 4, wherein the length is calculated from prior measurements of one or more target packages.

7. The method of claim 6, wherein the length is a threshold multiple of the absolute average deviation of prior measurements of two or more target packages.

8. The method of claim 1, wherein the 3D imaging data representing one or more dimensions of the target package is collected by one or more 3D cameras.

9. The method of claim 8, wherein the 3D imaging data representing one or more dimensions of the target package is collected by at least two 3D cameras positioned on opposite sides of the target package, and above the target package.

10. The method of claim 8, wherein the 3D imaging data representing one or more dimensions of the target package is collected by at least three 3D cameras, wherein at least one camera is positioned above the target package, and two cameras are positioned on opposite sides of the target package.

11. The method of claim 8, wherein the 3D imaging data representing one or more dimensions of the target package is collected by at least four 3D cameras, wherein at least two cameras are positioned on opposite sides of the target package, and at least two cameras are positioned above the target package.

12. The method of claim 1, wherein receiving the 3D imaging data representing one or more dimensions of the target package occurs while the target package is in a static position.

13. The method of claim 1, wherein receiving the 3D imaging data representing one or more dimensions of the target package occurs while the target package is in translation across a conveyor.

14. The method of claim 13, wherein the target package is comprised of at least one side, and the at least one side is oriented parallel to the direction of the conveyor.

15. The method of claim 13, wherein the target package is comprised of at least one side, and the at least one side is oriented at an angle to the direction of the conveyor.

16. The method of claim 13, wherein the receiving 3D imaging data representing one or more dimensions of the target package occurs when the target package is in any position across the width of the conveyor.

17. The method of claim 1, wherein the target package polyhedron is the minimum-sized polyhedron that can envelope the target package.

18. The method of claim 1, wherein the target package is a cuboid, and the reference package polyhedron is a cuboid.

19. The method of claim 1, wherein the target package is a cylinder, and the reference package polyhedron is comprised of multiple faces approximating the 3D shape of the cylinder.

20. The method of claim 1, wherein the target package is an irregular 3D shape, and the reference package polyhedron is comprised of multiple faces approximating the irregular 3D shape.

21. The method of claim 1, further comprising the steps:
comparing at least one of the two or more 2D slices of the target package to the reference package polyhedron,
issuing a pass/fail designation for the target package, wherein
a pass designation is issued if the reference package polyhedron is large enough to enclose at least one of the two or more 2D slices of the target package, and
a fail designation is issued if the reference package polyhedron is not large enough enclose the at least one of the two or more 2D slices of the target package.

22. The method of claim 1, further comprising the steps:
receiving at least one 2D reference package polygon, representing a 2D slice of the reference package polyhedron,
comparing at least one of the two or more 2D slices of the target package to the reference package polygon,
issuing a pass/fail designation for the target package, wherein
a pass designation is issued if the 2D reference package polygon is large enough to enclose the at least one of the two or more 2D slices of the target package, and
a fail designation is issued if the 2D reference package polygon is not large enough to enclose the at least one of the two or more 2D slices of the target package.

23. The method of claim1, further comprising the steps:
training a first AI model of a plurality of AI models to extract feature vectors from one or more images of packages,
extracting, via the first AI model of the plurality of AI modes, at least one feature vector from at least one image of the reference package,
training a second AI model of the plurality of AI models to extract feature vectors from one or more images of packages,
extracting, via the second AI model of the plurality of AI models, at least one feature vector from at least one image of the target package,
defining a threshold value based on a deviation from the at least one feature vector from the at least one image of the reference package,
comparing the at least one feature vector from the at least one image of the target package to the at least one feature vector from the at least one image of the reference package, and
determining, via a third AI model of the plurality of AI models, whether the at least one feature vector from the at least one image of the target package deviates beyond the threshold from the at least one feature vector from the at least one image of the reference package,
issuing a pass/fail designation for the target package, wherein
a pass designation is issued if the at least one feature vector from the at least one image of the target package does not deviate beyond the threshold from the at least one feature vector from the at least one image of the reference package, and
a fail designation is issued if the at least one feature vector from the at least one image of the target package does deviate beyond the threshold from the at least one feature vector from the at least one image of the reference package.

24. The method of claim 23, wherein the first AI model of the plurality of AI models is trained with ground-truth labels corresponding to detect-free packages.

25. The method of claim 23, wherein the at least one feature vector from the at least one image of the reference package represents a surface characteristic.

26. The method of claim 23, wherein the at least one feature vector from the at least one image of the reference package represents a geometric attribute.

27. The method of claim 23, wherein the at least one feature vector from the at least one image of the reference package represents a color.

28. The method of claim 23, wherein the one or more images of packages, the at least one image of the reference package, and the at least one image of the target package are 2D images.

29. The method of claim 23, wherein the one or more images of packages, the at least one image of the reference package, and the at least one image of the target package are 3D images.

* * * * *